March 8, 1966  P. S. MONROE  3,239,645
WELDING APPARATUS
Filed March 8, 1963
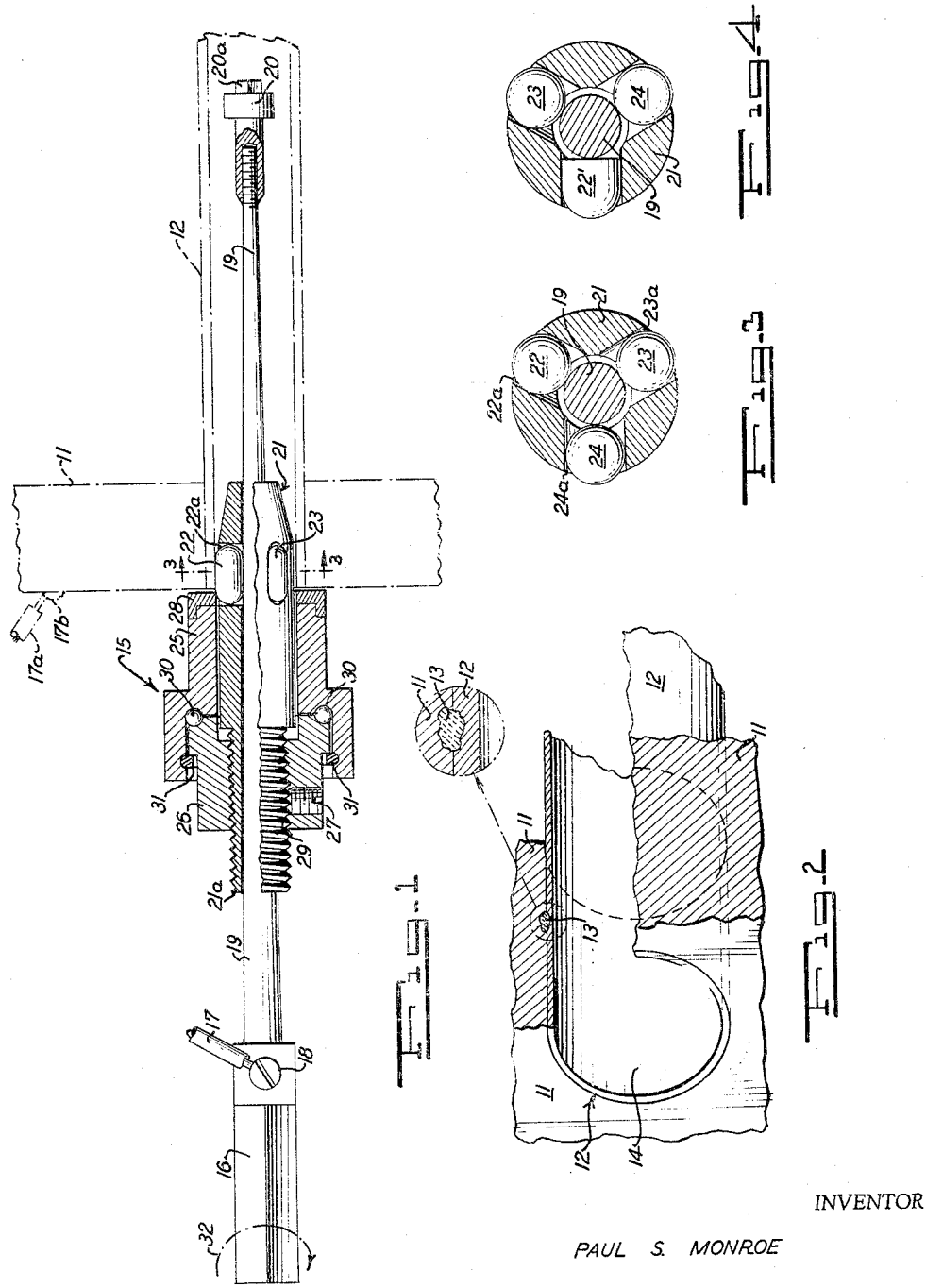
INVENTOR
PAUL S. MONROE
BY *William C. Long*
ATTORNEY United States Patent Office 3,239,645
Patented Mar. 8, 1966

3,239,645
WELDING APPARATUS
Paul S. Monroe, 27 Lenape Trail, Chatham, N.J.
Filed Mar. 8, 1963, Ser. No. 263,948
4 Claims. (Cl. 219—84)

This invention relates to seam welding processes and apparatus for internal seam welding of tubes to tube sheets in heat exchanger equipment and the like, and it relates also to the resulting article where the tubes are attached to the sheets by internal seam welds. More particularly, it relates to a seam welding tool which may be inserted into the tube after the latter is mounted in the sheet and optionally expanded in conventional manner, and in use, electric current is passed through a selected region of the internal contact area between the tube and the sheet to make a seam weld; the tool is adapted to be rotated so as to form the seam weld or series of overlapping weldments, so that the ultimate weld is ring-like in nature. The weld region width may be of the order of slightly above to about two to four times the thickness of the tube wall, and it may be located anywhere from just inside the tube end to substantially the nearer side of the tube sheet.

The art of forming seam welds is well developed and includes electronic control means to apply desired speed to rotating disc and electrical contact means as well as means for moving the discs to provide a continuous series of individual spot welds (see Am. Welding Soc., Welding Handbook, 4th edition, (1958), sec. 2, chapts. 30 and 32). The art is familar with current and pressure requirements, and their relationship to the metals being joined, the metallurgy of the latter and the thickness thereof. However, so far as it is known, no means is available for seam welding tubes to tube sheets at a contact region inwardly of the end of the tube. The usual methods for attaching tubes to tube sheets include expander rolling, furnace brazing strength welding, seal welding, as well as combinations thereof. However, in each case of brazing or welding the weld is substantially at the outer end of the tube. This is undesirable from the viewpoint of breakage due to the vibration of the tube during shipment of the welded article, or during use, or due to longitudinal stress due to expansion of the tubes or shell of the exchanger. Also, if a leak develop or is found, it is difficult to perform satisfactory repairs thereof. The art has been confronted by the problem of more satisfactory weld connections between tube and tube sheets. Also, the art has been confronted by the problem of providing satisfactory internal welds which may be made in a convenient and reliable manner, as well as providing suitable equipment therefor.

The discoveries associated with the invention and relating to the solution of the above problems, and the objects achieved in accordance with the invention as set forth herein include the provision of:

A process for preparing an internal weld between a relatively thin metallic member and a relatively thick metallic member, the latter being provided with an opening into which the thin member is inserted so as to provide metal to metal contact, the thin member being relatively elongated and provided with an internal passageway, which method comprises applying pressure and electric current in a localized contact region whereby a welded region is formed, and moving the region of localized pressure and current in a predetermined path to provide a continuous weldment;

Such a method wherein the thin member is a round tube and the thick member is a tube sheet, the width of the weld region being at least equal to the thickness of the tube;

Such a method wherein the tube sheet is about 2 inches thick, the tube is about 0.062 inch thick and 1 inch in external diameter and the width of the weld is about at least 0.15 inch, said weld being at least ¼" in from either surface of the tube sheet;

Such a process wherein the localized pressure and current is applied in a rolling contact manner;

Such a process wherein the localized pressure and current is applied in a friction contact manner;

A welded metallic article including a relatively thick sheet member and a relatively thin member inserted in an opening in the sheet member and joined thereto by a weld located inwardly from either surface of the sheet member;

Such an article wherein the width of the weld is at least equal to the thickness of the thin member;

Such an article wherein the thick member is a tube sheet about 2 inches thick, and the thin member is about 0.062 inch thick and 1 inch in external diameter and the width of the weld is about at least 0.15 inch, said weld being at least ¼" in from each surface of the tube sheet;

An electrical welding tool adapted for making an internal seam weld is an assembly of a relatively thick sheet member and a relatively thin tube member, which tube member is inserted with metal to metal contact in an appropriate opening through the sheet member; said tool including electrical conducting means provided with localized contact means adapted to the inserted into and contact a localized area of said tube in the region of contact between the tube and the sheet member, said means being provided with means for applying pressure at said point of contact;

Such a tool provided with means for rotating same through 360°;

Such a tool provided with roller electrical contact and pressure means;

Such a tool provided with insulated roller and tapered shaft pressure applying means;

Such a tool provided with frictional electrical contact and pressure means;

Such a tool provided with insulated roller and tapered shaft pressure applying means;

And other objects which will be apparent as details or embodiments of the invention are set forth hereinafter.

In the accompanying drawings, FIGURE 1 is a schematic illustration of the welding operation showing a view partly in section of a welding tool inserted in the tube with the electrical connection and direction of rotation during the welding, FIGURE 2 is a perspective view, partly broken away of a portion of a tube sheet containing a tube internal seam welded thereto; and FIGURE 3 is a section along lines 3—3 of FIGURE 1 as is FIGURE 4, all in accordance with the invention.

In order to indicate still more fully the nature of the present invention, the following examples of typical procedures, tools and products, are set forth, it being understood that these examples are presented as illustrative only and they are not intended to limit the scope of the invention.

*Example 1*

The conventional tube and sheet assembly (enclosed in a shell) is made in conventional manner having tubes about 1 inch in diameter and wall thickness of 0.62 inch, the length of each tube being 10 ft. and the thickness of the tube sheet being about 2 inches. The tube is clean at the contact area and is expanded by conventional means so that contact is made by each tube and the tube sheet, optionally using a Wilson tube expander or the like means. Then the welding tool (described below) is inserted in an end of one tube, electrical connections are made to conventional seam welding apparatus and the welding tool is set for a pressure of about 1200 pounds per square inch. The rotational speed of the welding tube is such as to make one full rotation in about 3⅓ seconds. This provides overlapping welds of approximately seven per inch of weldments. This procedure is repeated for each tube end, and likewise in the sheet at the other end of each tube.

Referring to FIGURE 2, the tube sheet 11 is provided with a bore and the tube 12 is inserted therein so that its outer ends is substantially flush with the outer side of the tube sheet (and the formed weldment is represented by 13). A short section 14 of the tube extends outwardly from the weld to the outside of the tube sheet. For this particular assembly, the width of the weld is about 0.15 to about 0.20 inch. The weld may be located as desired nearer to the end of the tube or nearer to the inner side of the tube sheet. If desired a plurality of ring-like welds may be made. Also, if desired, the bore in the tube sheet may be provided with grooves or recesses. Where a leak or damage to a weld has occurred (including a conventional outside seam weld or the like), a new weld may be prepared readily in accordance with the invention, located inwardly from the outer end of the tube, or inwardly from either surface of the tube sheet.

In any case, a strong reliable welded article is obtained.

As to the welding tool, one embodiment is illustrated in FIGURES 1 and 3. The tool 15 includes a shaft member having a square end 16 and an electrical cable 17 connected thereto by screw or the like means 18, tapered shank 19 and a threaded cap member 20 having a squared end 20a. It also includes a cage 21 having three longitudinal slots therein 22a, 23a, 24a, which carry tapered rollers 22, 23, 24, which fit therein. The slots are at a slight angle to the axis of the shaft and are tapered to accommodate the rollers. The cage is also provided with a threaded seceion 21a, a collar 25, a collar adjuster 26 with internal threads matching threads 21a and a set screw 27 for locking the adjuster in position. The collar is held on the adjuster by ring 31 and is free to rotate relative to the adjuster on ball bearings 30. The collar is provided with insulating end 28. To insert the rollers, cap 20 is removed, the shank is removed from the cage, and each roller is inserted (from inside the cage). There the shank is put back in position.

As to the welding operation, reference is made to FIGURE 1 which shows the welding tool set in position in a schematic section of tube 12 and tube sheet 11. The electrical cable 17 is connected to the tool and another electrical cable 17a is connected to the sheet by connection 17b which may be by clamping, spot welding, or the like. The electrical current is provided by conventional means (not shown). The tool is provided with conventional rotational means adapted to be rotated in the direction of arrow 32. It may be rotated by hand, by an air tool or by geared electrical means or the like. Of the three rolls in the welding tool, only one is an electrical conductor e.g. hard bronze, or the like. The other two are of an insulating material such as ground porcelain or the like. In operation, the tool is inserted to give desired pressure and the current is carried through the conducting roll 22 at the weld region through the tube and tube sheet forming a spot weld and as the tool is rotated a series of these welds is formed. The operation is continued until the weldment is complete around the tube. If desired, the current may be applied in a regulated intermittent manner. Electrical control means are available for providing such current.

Test weldings of a flattened piece of tubing and the tube sheet may be made on conventional equipment for determining current and pressure characteristics, if desired.

*Example 2*

Example 1 is repeated except that instead of conducting roll 22, a prong 22' (FIGURE 4) having a rounded nose is provided for carrying the current the other two insulating rolls being used to provide the desired pressure and relatively free rotation. This gives desirable results also.

Other equivalent means may be used providing the pressure and current in the localized region of the weld, including means provided with a current carrying prong and external rotational support means for providing the pressure, thus eliminating internal rolls or the like.

Generally the length of the rolls at the area of contact of the electrical conducting means at the weld region is such as to provide the desired width of weld, which desirably at least the thickness of the tube or substantially above. Generally 1½ to 2 or more times the thickness is regarded as adequate.

In view of the foregoing disclosures, variations and modifications thereof will be apparent to one skilled in the art, and it is intended to include within the invention all such variations and modifications except as do not come within the scope of the appended claims.

What is claimed is:

1. A welding tool for circumferentially welding the external surface of a tube to a surrounding surface which comprises: a substantially cylindrical body portion having a collar overlying said cylindrical body portion, said collar limiting the degree of insertion of said cylindrical body portion in said tube; a series of prongs radially projecting from said body portion; means for radially positioning each of said prongs against the inner surface of said tube; rotating means adopted to move said prongs along a circumferential path about the internal surface of said tube; and conducting means adapted to conduct electricity through at least one of said prongs to said tube.

2. A welding apparatus for circumferentially welding the external surface of a tube to a surrounding surface which comprises: a longitudinally disposed thick walled hollow cylinder having a plurality of radially disposed slots; a prong slidably positioned within each of said slots; a collar overlying said cylinder limiting the degree of insertion of said cylinder in said tube; a tapered rod longitudinally disposed within said cylinder and abutting aganst each of said prongs, said rod being adapted to actuate each of said prongs radially against the inner surface of said tube; means for conducting electric current through at least one of said prongs; and means for rotating said thick walled cylinder.

3. A welding tool which comprises: a thick walled hollow cylinder having a collar overlying said cylinder, said collar limiting the degree of insertion of said cylinder in a tube, said cylinder having a plurality of radially disposed slots at one end thereof; a plurality of rollers adapted to slide within said slots; a tapered rod longitudinally disposed within the hollow of said cylinder so that reciprocal motion thereof radially positions said rollers; means for conducting electric current through at least one of the said rollers; and means for rotating said cylinder.

4. The welding tool of claim 2 wherein said rotation means is adapted to rotate said cylinder about the longitudinal axis of said tube.

References Cited by the Examiner
UNITED STATES PATENTS

| | | | |
|---|---|---|---|
| 1,318,495 | 10/1919 | Huston | 219—160 X |
| 2,208,676 | 7/1940 | Kosman | 219—66 |
| 2,004,389 | 6/1935 | Jones | 219—161 X |
| 2,323,903 | 7/1943 | Fentress | 219—66 |

RICHARD M. WOOD, *Primary Examiner.*